(12) United States Patent
Kim

(10) Patent No.: US 11,363,484 B2
(45) Date of Patent: Jun. 14, 2022

(54) METHOD FOR PERFORMING MEASUREMENT AND DEVICE SUPPORTING THE SAME

(71) Applicant: LG ELECTRONICS INC., Seoul (KR)

(72) Inventor: Sangwon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 34 days.

(21) Appl. No.: 17/048,079

(22) PCT Filed: Jun. 26, 2019

(86) PCT No.: PCT/KR2019/007695
§ 371 (c)(1),
(2) Date: Oct. 15, 2020

(87) PCT Pub. No.: WO2020/004923
PCT Pub. Date: Jan. 2, 2020

(65) Prior Publication Data
US 2021/0105648 A1 Apr. 8, 2021

(30) Foreign Application Priority Data

Jun. 26, 2018 (KR) .................. 10-2018-0073652
Jun. 27, 2018 (KR) .................. 10-2018-0074354

(51) Int. Cl.
*H04W 24/10* (2009.01)
*H04W 76/19* (2018.01)
(Continued)

(52) U.S. Cl.
CPC .......... *H04W 24/10* (2013.01); *H04B 7/0626* (2013.01); *H04W 56/001* (2013.01);
(Continued)

(58) Field of Classification Search
CPC ... H04W 24/10; H04W 48/20; H04W 56/001; H04W 72/005; H04W 72/0413;
(Continued)

(56) References Cited

U.S. PATENT DOCUMENTS

2017/0048898 A1  2/2017 Jung
2018/0102817 A1  4/2018 Park et al.
(Continued)

FOREIGN PATENT DOCUMENTS

WO  2017/180335  10/2017

OTHER PUBLICATIONS

PCT International Application No. PCT/KR2019/007695, International Search Report dated Oct. 16, 2019, 2 pages.
(Continued)

*Primary Examiner* — Jean A Gelin
(74) *Attorney, Agent, or Firm* — Lee Hong Degerman Kang & Waimey

(57) ABSTRACT

Provided are a method for performing measurement and a device supporting the method. According to one embodiment of the present disclosure, the method includes: receiving a first configuration of a first reference signal (RS) type based measurement; performing the first RS type based measurement on a serving cell based on the first configuration; and initiating a second RS type based measurement on the serving cell, when a radio link problem related to the serving cell is detected.

11 Claims, 11 Drawing Sheets

(51) Int. Cl.
*H04W 76/27* (2018.01)
*H04B 7/06* (2006.01)
*H04W 56/00* (2009.01)
*H04W 72/00* (2009.01)

(52) U.S. Cl.
CPC ......... *H04W 72/005* (2013.01); *H04W 76/19* (2018.02); *H04W 76/27* (2018.02)

(58) Field of Classification Search
CPC ........... H04W 72/042; H04W 72/1284; H04W 74/0833; H04W 76/19; H04W 76/27; H04B 7/0617; H04B 7/0626
See application file for complete search history.

(56) References Cited

U.S. PATENT DOCUMENTS

2019/0261287 A1* 8/2019 Deenoo ................ H04W 24/08
2020/0037332 A1* 1/2020 da Silva .............. H04W 72/005
2020/0221319 A1* 7/2020 Kang .................... H04B 7/0695
2020/0344019 A1* 10/2020 Da Silva ............. H04B 7/0626
2021/0028984 A1* 1/2021 Da Silva ............... H04W 24/08

OTHER PUBLICATIONS

3GPP; TSGRAN; NR; Phyiscal layer procedures for control (Release 15); 3GPP TS 38.213 V15.1.0 (Mar. 2018); 79 pages.

3GPP; TSGRAN; NR; Radio Resource Control (RRC) protocol specification (Release 15); 3GPP TS 38.331 V15.2.1 (Jun. 2018); 305 pages.

* cited by examiner

METHOD FOR PERFORMING MEASUREMENT AND DEVICE SUPPORTING THE SAME

CROSS-REFERENCE TO RELATED APPLICATIONS

This application is the National Stage filing under 35 U.S.C. 371 of International Application No. PCT/KR2019/007695, filed on Jun. 26, 2019, which claims the benefit of earlier filing date and right of priority to Korean Application Nos. 10-2018-0073652, filed on Jun. 26, 2018, and 10-2018-0074354, filed on Jun. 27, 2018, the contents of which are all hereby incorporated by reference herein in their entirety.

TECHNICAL FIELD

The present invention relates to a wireless communication system, and more particularly, to a method for performing measurement and a device supporting the same.

BACKGROUND

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

In NR, a UE in RRC_CONNECTED is configured to perform not only CSI-RS based measurement, but also SSB based measurement. In measurement reporting, a UE is configured to report a measurement result based on SSB if available, otherwise report a measurement result based on CSI-RS. In other words, the UE is not always forced to acquire a result of SSB based measurement.

Meanwhile, in cell (re)selection procedure, the UE is configured to select one of neighbor cells only based on result of SSB based measurement. Thus, it is required to perform SSB based measurement for cell selection, when the UE is not performing SSB based measurement.

SUMMARY

According to a prior art, it requires time for the UE to acquire the SSB measurement configuration and to start the measurement only after the RRC connection re-establishment procedure is initiated. That is, if the UE starts SSB based measurement after the radio link problem is detected, it may cause delay the cell selection procedure for RRC connection re-establishment.

According to an embodiment of the present invention, a method performed by a user equipment (UE) in a wireless communication system is provided. The method may comprise: receiving a first configuration of a first reference signal (RS) type based measurement; performing the first RS type based measurement on a serving cell based on the first configuration; and initiating a second RS type based measurement on the serving cell, when a radio link problem related to the serving cell is detected.

The initiating the second RS type based measurement may include receiving a second configuration of the second RS type based measurement.

The receiving the second configuration may include requesting the second configuration before a radio link failure on the serving cell is detected.

The method may further comprise performing cell selection based on a result of the second RS type based measurement, when a radio link failure on the serving cell is detected.

It may be determined that the radio link problem is detected when a result of the first RS based measurement on the serving cell becomes below a first threshold.

It may be determined that the radio link problem is detected when N consecutive out-of-sync indications for the serving cell is received from a physical layer.

The serving cell may be a primary cell (PCell).

A result of the first RS based measurement may not be used for cell selection.

The first RS type based measurement may be a channel state information reference signal (CSI-RS) based measurement.

The second RS type based measurement may be a synchronization signal (SS)/physical broadcast channel (PBCH) block (SSB) based measurement.

The radio link problem may be at least one of radio link failure, handover failure, integrity check failure and radio resource control (RRC) connection reconfiguration failure.

The UE may be in RRC connected state.

The method may further comprise stopping the second RS type based measurement, when the radio link problem related to the serving cell is resolved.

The UE may communicate with at least one of a mobile terminal, a network or autonomous vehicles other than the UE.

According to another embodiment of the present invention, a user equipment (UE) in a wireless communication system is provided. The UE may comprise: a memory; a transceiver; and a processor, operably coupled to the memory and the transceiver, and configured to: control the transceiver to receive a first configuration of a first reference signal (RS) type based measurement; perform the first RS type based measurement on a serving cell based on the first configuration; control the transceiver to receive a second configuration of a second RS type based measurement, when a radio link problem related to the serving cell is detected; and perform the second RS type based measurement on the serving cell based on the second configuration.

The processor may be further configured to perform cell selection based on a result of the second RS type based measurement, when a radio link failure on the serving cell is detected.

According to another embodiment of the present invention, a processor for a wireless communication device in a wireless communication system is provided. The processor may be configured to control the wireless communication device to: receive a first configuration of a first reference signal (RS) type based measurement; perform the first RS type based measurement on a serving cell based on the first configuration; receive a second configuration of a second RS type based measurement, when a radio link problem related to the serving cell is detected; and perform the second RS type based measurement on the serving cell based on the second configuration.

According to embodiments of the present invention, the UE may perform SSB based measurement without delays, by requesting configurations of the SSB based measurement as soon as the radio link problem is detected.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
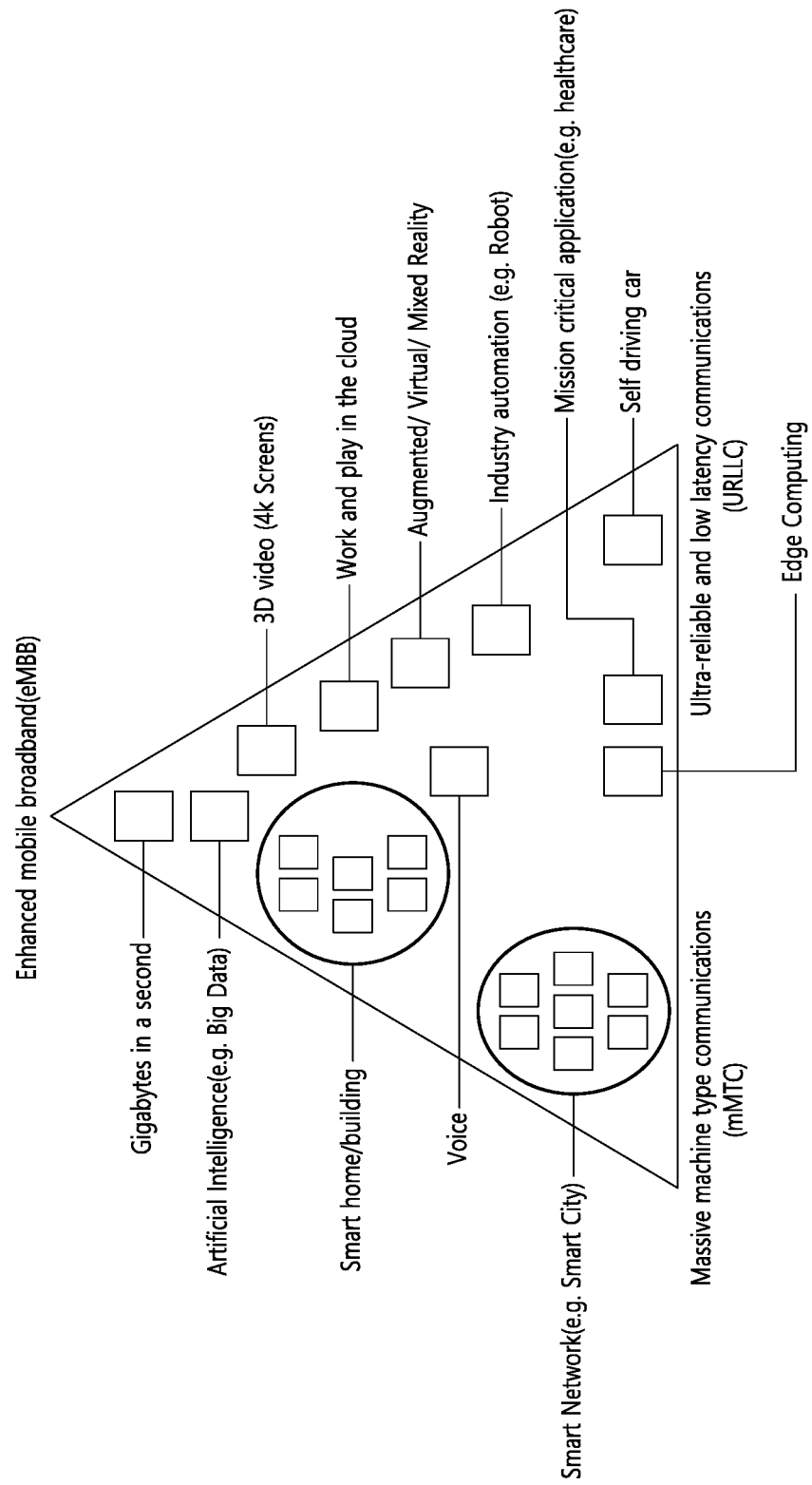
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
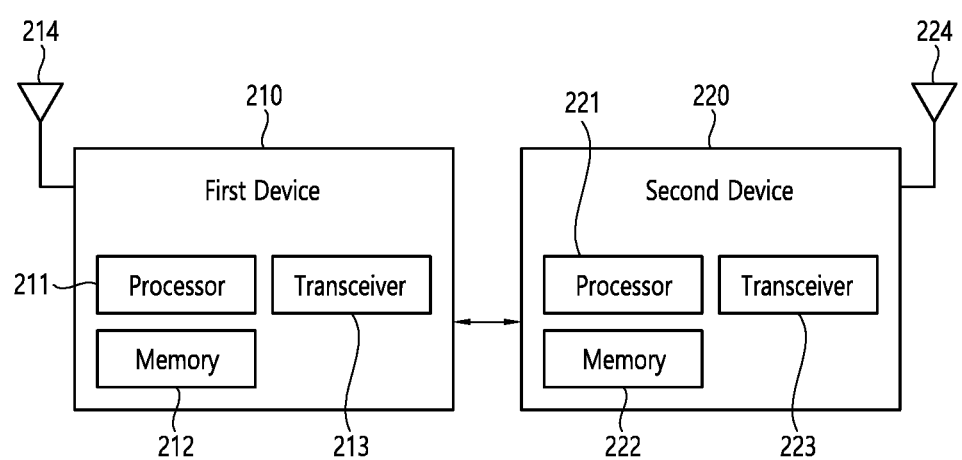
FIG. 2 shows an example of a wireless communication system to which the technical features of the present invention can be applied.

FIG. 2 shows an example of a wireless communication system to which the technical features of the present invention can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
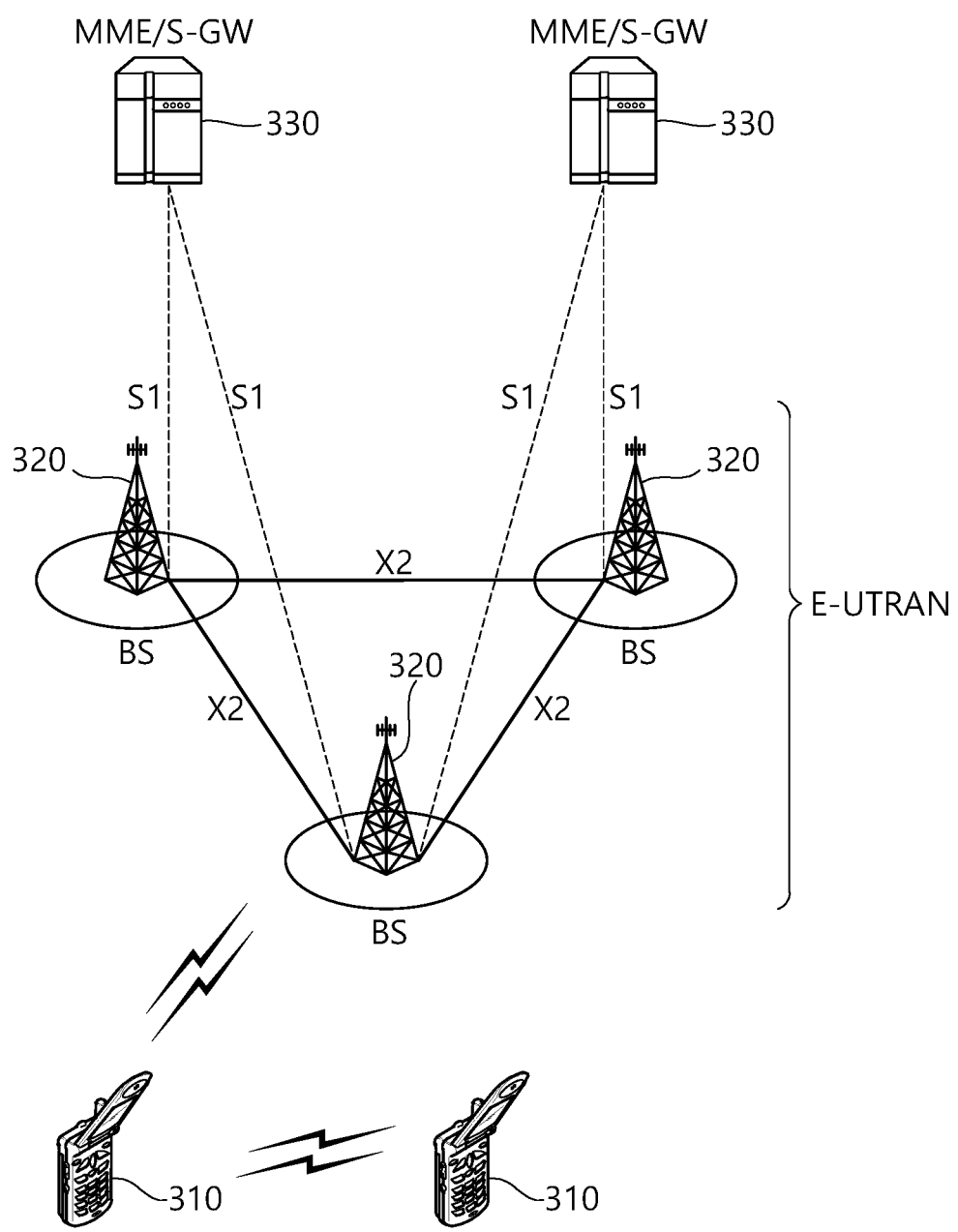
FIG. 3 shows an example of a wireless communication system to which the technical features of the present invention can be applied.

FIG. 3 shows an example of a wireless communication system to which the technical features of the present invention can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
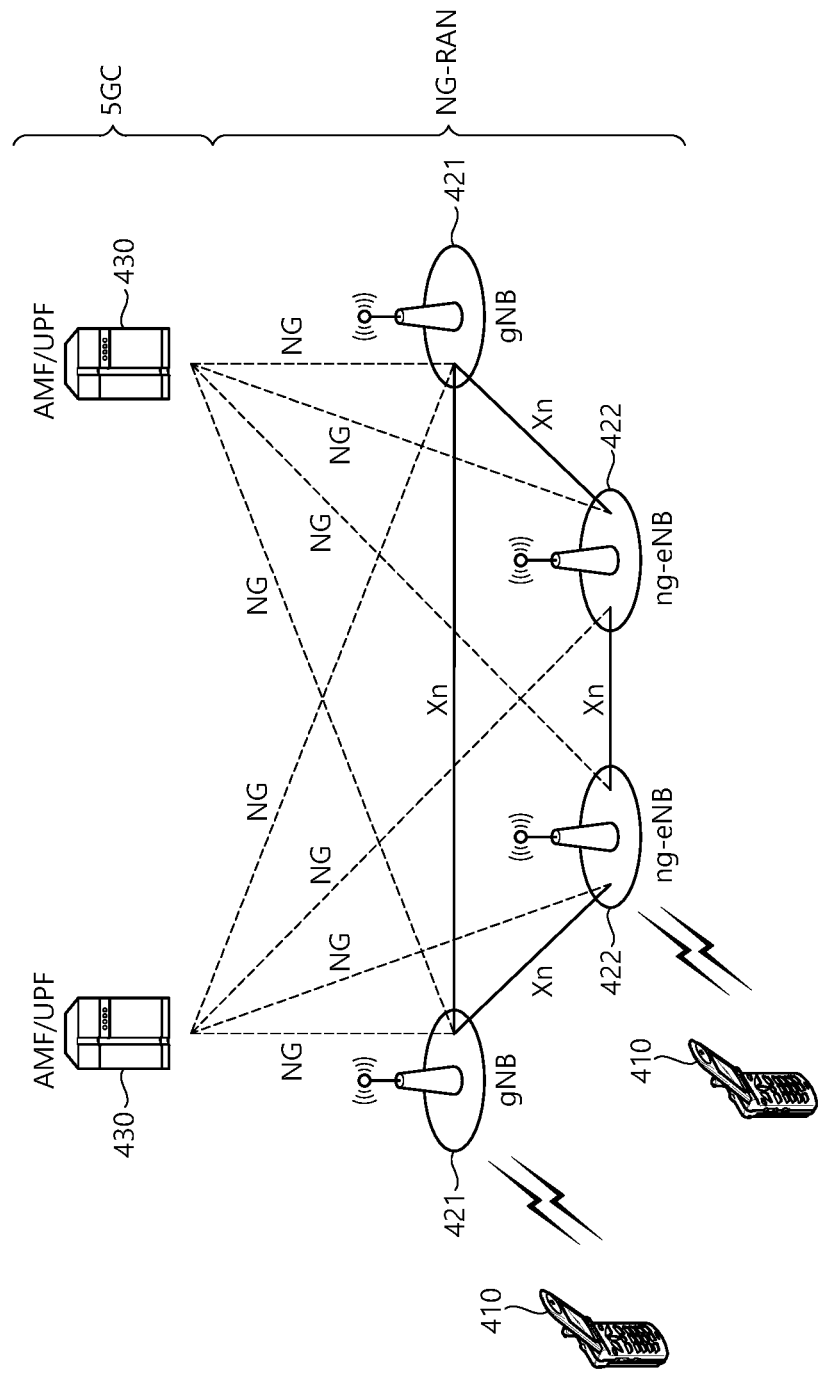
FIG. 4 shows another example of a wireless communication system to which the technical features of the present invention can be applied.

FIG. 4 shows another example of a wireless communication system to which the technical features of the present invention can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
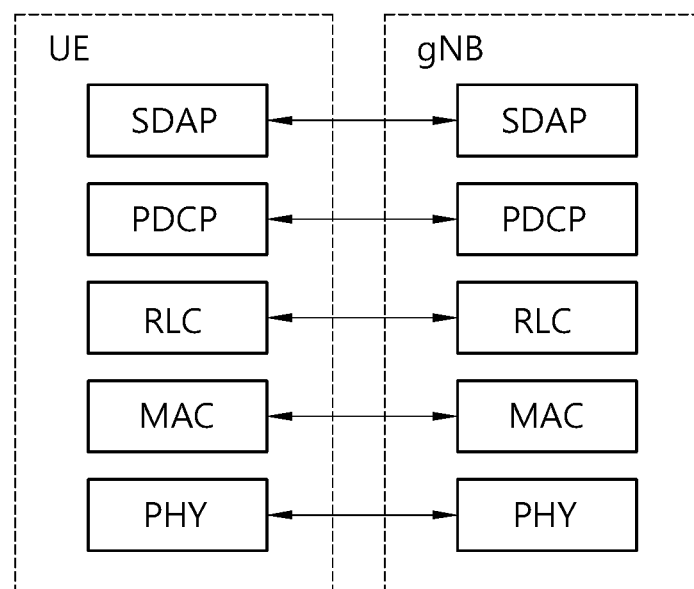
FIG. 5 shows a block diagram of a user plane protocol stack to which the technical features of the present invention can be applied.
Figure 6:
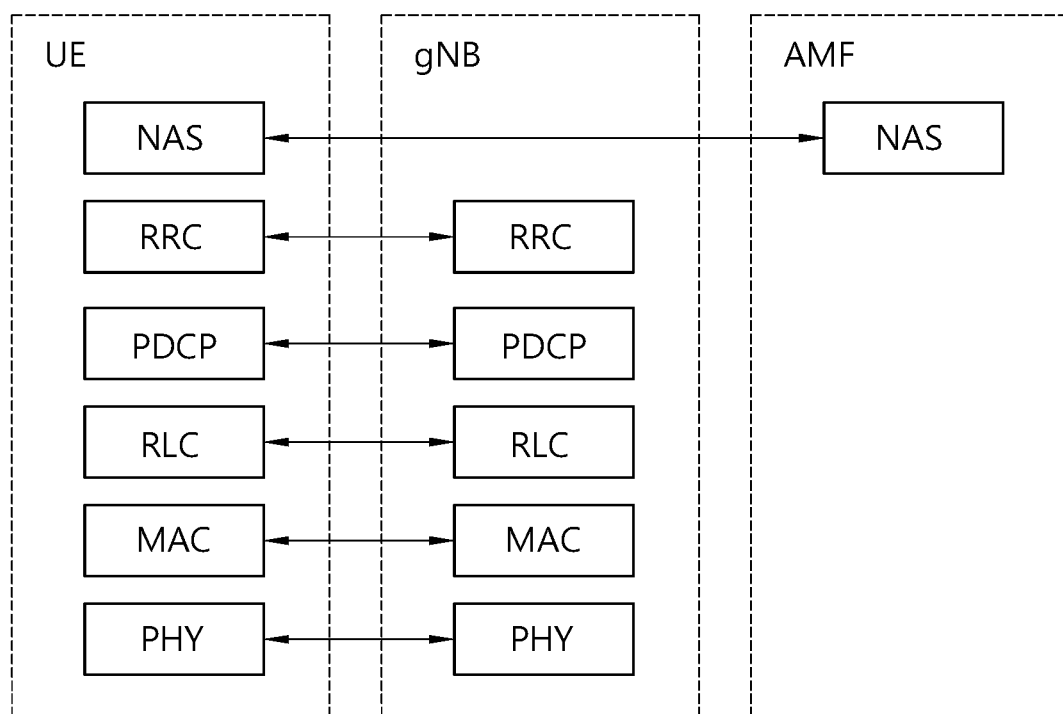
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

An RRC_CONNECTED UE shall derive cell measurement results by measuring one or multiple beams associated per cell as configured by the network. For all cell measurement results in RRC_CONNECTED the UE applies the layer 3 filtering, before using the measured results for evaluation of reporting criteria and measurement reporting. For cell measurements, the network can configure RSRP, RSRQ or SINR as trigger quantity. Reporting quantities can be the same as trigger quantity or combinations of quantities (i.e. RSRP and RSRQ; RSRP and SINR; RSRQ and SINR; RSRP, RSRQ and SINR).

The network may also configure the UE to report measurement information per beam (which can either be measurement results per beam with respective beam identifier(s) or only beam identifier(s)). If beam measurement information is configured to be included in measurement reports, the UE applies the layer 3 beam filtering. On the other hand, the exact layer 1 filtering of beam measurements used to derive cell measurement results is implementation dependent.

The network may configure the UE to derive RSRP, RSRQ and SINR measurement results per cell associated to NR measurement objects based on parameters configured in the measObject (e.g. maximum number of beams to be averaged and beam consolidation thresholds) and in the reportConfig (rsType to be measured, SS/PBCH block or CSI-RS).

The UE shall:
1> for each cell measurement quantity to be derived based on SS/PBCH block:
2> if nrofSS-BlocksToAverage in the associated measObject is not configured; or
2> if absThreshSS-BlocksConsolidation in the associated measObject is not configured; or
2> if the highest beam measurement quantity value is below absThreshSS-BlocksConsolidation:
3> derive each cell measurement quantity based on SS/PBCH block as the highest beam measurement quantity value;
2> else:
3> derive each cell measurement quantity based on SS/PBCH block as the linear average of the power values of the highest beam measurement quantity values above absThreshSS-BlocksConsolidation where the total number of averaged beams shall not exceed nrofSS-BlocksToAverage;
2> apply layer 3 cell filtering;
1> for each cell measurement quantity to be derived based on CSI-RS:
2> consider a CSI-RS resource to be applicable for deriving cell measurements when the concerned CSI-RS resource is included in the csi-rs-ResourceCellMobility including the physCellId of the cell in the CSI-RS-ConfigMobility in the associated measObject;
2> if nrofCSI-RS-ResourcesToAverage in the associated measObject is not configured; or
2> if absThreshCSI-RS-Consolidation in the associated measObject is not configured; or
2> if the highest beam measurement quantity value is below absThreshCSI-RS-Consolidation:
3> derive each cell measurement quantity based on applicable CSI-RS resources for the cell as the highest beam measurement quantity value;
2> else:
3> derive each cell measurement quantity based on CSI-RS as the linear average of the power values of the highest beam measurement quantity values above absThreshCSI-RS-Consolidation where the total number of averaged beams shall not exceed nroCSI-RS-ResourcesToAverage;
2> apply layer 3 cell filtering.

The cell measurement quantity based on SS/PBCH block (hereinafter, SSB based measurement) is one of SS reference signal received power (SS-RSRP), SS reference signal received quality (SS-RSRQ) and SS signal-to-noise and interference ratio (SS-SINR).

SS-RSRP is defined as the linear average over the power contributions of the resource elements that carry secondary synchronization signals. The measurement time resource(s) for SS-RSRP are confined within SS/PBCH Block Measurement Time Configuration (SMTC) window duration.

SS-RSRQ is defined as the ratio of N*SS-RSRP/NR carrier RSSI, where N is the number of resource blocks in the NR carrier RSSI measurement bandwidth. The measurements in the numerator and denominator shall be made over the same set of resource blocks. NR carrier Received Signal Strength Indicator (NR carrier RSSI), comprises the linear average of the total received power observed only in certain OFDM symbols of measurement time resource(s), in the measurement bandwidth, over N number of resource blocks from all sources, including co-channel serving and non-serving cells, adjacent channel interference, thermal noise etc. For cell selection, the measurement time resources(s) for NR Carrier RSSI are not constrained. Otherwise, the measurement time resource(s) for NR Carrier RSSI are confined within SS/PBCH Block Measurement Time Configuration (SMTC) window duration.

SS-SINR is defined as the linear average over the power contribution of the resource elements carrying secondary synchronization signals divided by the linear average of the noise and interference power contribution over the resource elements carrying secondary synchronization signals within the same frequency bandwidth. The measurement time resource(s) for SS-SINR are confined within SS/PBCH Block Measurement Time Configuration (SMTC) window duration.

The cell measurement quantity based on CSI-RS (hereinafter, CSI-RS based measurement) is one of CSI reference signal received power (CSI-RSRP), CSI reference signal received quality (CSI-RSRQ) and CSI signal-to-noise and interference ratio (CSI-SINR).

CSI-RSRP is defined as the linear average over the power contributions of the resource elements of the antenna port(s) that carry CSI reference signals configured for RSRP measurements within the considered measurement frequency bandwidth in the configured CSI-RS occasions.

CSI-RSRQ is defined as the ratio of N*CSI-RSRP to CSI Received Signal Strength Indicator (CSI-RSSI), where N is the number of resource blocks in the CSI-RSSI measurement bandwidth. The measurements in the numerator and denominator shall be made over the same set of resource blocks.

CSI-RSSI comprises the linear average of the total received power observed only in OFDM symbols of measurement time resource(s), in the measurement bandwidth, over N number of resource blocks from all sources, including co-channel serving and non-serving cells, adjacent channel interference, thermal noise etc. The measurement time resource(s) for CSI-RSSI corresponds to OFDM symbols containing configured CSI-RS occasions.

CSI-SINR is defined as the linear average over the power contribution of the resource elements carrying CSI reference signals divided by the linear average of the noise and interference power contribution over the resource elements carrying CSI reference signals reference signals within the same frequency bandwidth.

According to a prior art, a UE in RRC_CONNECTED is configured to perform not only CSI-RS based measurement, but also SSB based measurement. In measurement reporting, a UE is configured to report a measurement result based on SSB if available, otherwise report a measurement result based on CSI-RS. In other words, the UE is not always forced to acquire a result of SSB based measurement.

Meanwhile, in cell selection procedure, the UE is configured to select one of neighbor cells only based on result of SSB based measurement. Thus, it is required to perform SSB based measurement for cell selection, when the UE is not performing SSB based measurement.

In specific, when a radio link problem is detected, the UE may perform connection re-establishment procedure including cell selection. Assuming that the UE does not have result of SSB based measurement, the UE need to perform SSB based measurement, because the SSB based measurement is essential for cell selection procedure. In other words, upon initiation of the RRC connection re-establishment procedure, if the UE is not performing the SSB based measurement, the UE should start the SSB based measurement for cell selection.

However, it requires time for the UE to acquire the SSB measurement configuration and to start the measurement only after the RRC connection re-establishment procedure is initiated. That is, if the UE starts SSB based measurement after the radio link problem is detected, it may cause delay the cell selection procedure for RRC connection re-establishment. In this description, the SSB based measurement may be for a radio resource management (RRM).

Figure 7:
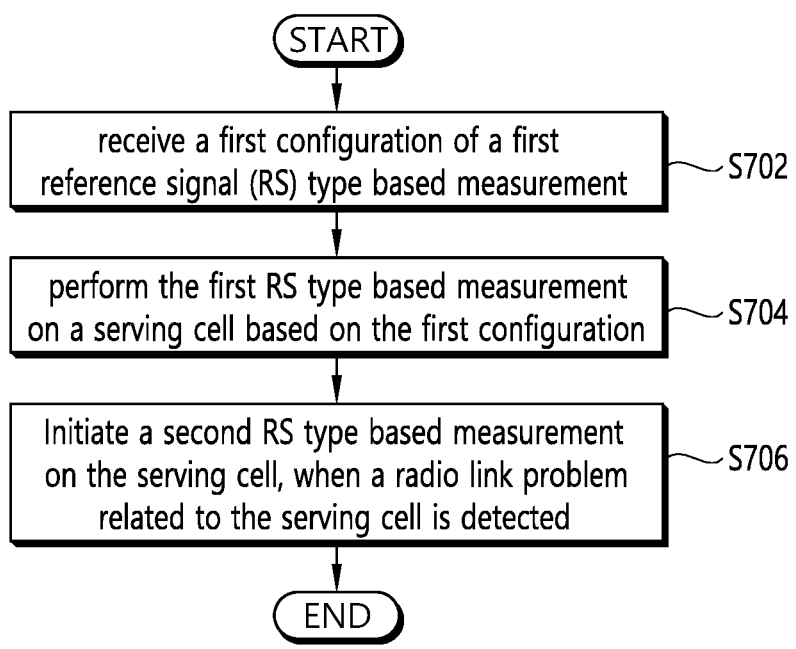
FIG. 7 shows a method for performing measurement according to an embodiment of the present invention.

FIG. 7 shows a method for performing measurement according to an embodiment of the present invention.

In step S702, the UE may receive a first configuration of a first reference signal (RS) type based measurement. A result of the first RS type based measurement may be not used for cell selection. The first RS type based measurement may be a channel state information reference signal (CSI-RS) based measurement. The UE may be in RRC connected state. The UE may communicate with at least one of a mobile terminal, a network or autonomous vehicles other than the UE.

In step S704, the UE may perform the first RS type based measurement on a serving cell based on the first configuration.

In step S706, the UE may initiate a second RS type based measurement on the serving cell, when a radio link problem related to the serving cell is detected. The serving cell may be a primary cell (PCell). The initiating the second RS type based measurement may include receiving a second configuration of the second RS type based measurement. The UE may receive the second configuration by requesting the second configuration before a radio link failure on the serving cell is detected. It may be determined that the radio link problem is detected based on a result of the first RS based measurement on the serving cell. It may be determined that the radio link problem is detected when a result of the first RS based measurement on the serving cell becomes below a first threshold. It may be determined that the radio link problem is detected when N consecutive out-of-sync indications for the serving cell is received from a physical layer. A result of the second RS type based measurement may be used for cell selection. The second RS type based measurement may be a SS/PBCH block (SSB) based measurement. The radio link problem may be at least one of radio link failure, handover failure, integrity check failure and radio resource control (RRC) connection reconfiguration failure.

Further, the UE may perform cell selection based on a result of the second RS type based measurement, when a radio link failure on the serving cell is detected. The UE may stop the second RS type based measurement, when the radio link problem related to the serving cell is resolved.

According to embodiments of the present invention, the UE may perform SSB based measurement without delays, by requesting configurations of the SSB based measurement as soon as the radio link problem is detected.

According to an embodiment of the present invention, a UE in RRC_CONNECTED may start to perform SSB based measurement, when an initiation of RRC connection re-establishment is expected. Thus, the UE may perform SSB based measurement prior to the initiation of RRC connection re-establishment. In specific, the UE may perform SSB based measurement, as soon as radio link problem is detected. When at least one of the following conditions is met, it may be assumed that the radio link problem is detected.

if UE detects radio link failure, or
if RRC layer in UE detects physical layer problem for the PCell, and/or if RRC layer in UE receives "out-of-sync" indication for the PCell from physical layers, and/or
if RRC layer in UE receives N consecutive "out-of-sync" indications for the PCell from physical layers, and/or
if CSI-RS based measurement result of PCell becomes lower than first threshold, and/or
if UE doesn't perform SSB based measurement for the PCell, and/or
if RRC connection re-establishment procedure is initiated, and/or
if cell selection procedure is initiated, and/or
if handover failure or mobility from NR failure happens, and/or
if RRC layer in UE receives integrity check failure indication from physical layer, and/or
if RRC connection reconfiguration failure happens.

The UE may perform CSI-RS based measurement for RRM to detect RLF.

Regarding out-of-sync indication, it may be assumed that the UE is performing radio link monitoring (RLM) based on SSB. The out-of-sync indication may be transmitted based on the result of the RLM. However, even when the UE performs RLM based on SSB, the UE still may not have adequate result of measurement, which is SSB based measurement for RRM, to perform the cell selection.

To perform SSB based measurement, the UE may receive SSB measurement configuration. The SSB measurement configuration may be provided by SIB3, 4 or 5. The SSB based measurement may be performed on PCell frequency, and/or for all serving frequencies, and/or all frequencies indicated by the SSB measurement configuration. It may be assumed that the UE is not performing the SSB based measurement until the radio link problem is detected.

According to an embodiment of the present invention, a UE in RRC_CONNECTED may stop performing SSB based measurement, when at least one of the following condition is met.

if RRC layer in UE detects recovery of physical layer problems for the PCell, and/or
if RRC layer in UE receives "in-sync" indication for the PCell from physical layers, and/or
if RRC layer in UE receives M consecutive "in-sync" indications for the PCell from physical layers, and/or
if CSI-RS based measurement result of PCell becomes higher than second threshold, and/or
if RRC connection re-establishment procedure is complete, and/or
if cell selection procedure is complete.

The UE may stop performing SSB based measurement only for frequencies that the UE is measuring. The above conditions to stop performing the SSB based measurement may be provided via broadcast configuration. When the UE stores dedicated configuration for a specific frequency, the UE may keep performing the SSB based measurement on the specific frequency in accordance with the dedicated configuration though above condition is met.

If cell selection is initiated, the UE may perform cell selection procedure based on the result of the SSB based measurement. That is, the UE may decide whether candidate cell satisfies cell selection criterion S or not, by using the result of the SSB based measurement.

For example, if a result of CSI-RS based measurement of PCell becomes lower than a first threshold while UE doesn't perform SSB, i.e. SS/PBCH, based measurement for the PCell, the UE may start performing the SSB based measurement for PCell frequency. The UE may perform the SSB based measurement in accordance with broadcast configuration, e.g. SIB3 and/or SIB4. Additionally, when the result of CSI-RS based measurement of PCell becomes lower than the first threshold, the UE may start the SSB based measurement for neighbor frequencies and/or other serving frequencies indicated in the broadcast configuration, e.g. SIB4, if the UE is not performing the SSB based measurement for the frequency. Desirably, even though the UE is performing the SSB based measurement for the PCell frequency, the UE may start the SSB based measurement according to the broadcast configuration for frequency for which the UE doesn't perform SSB based measurement, if the result of CSI-RS based measurement of PCell becomes lower than a first threshold.

The UE may receive the system information to acquire the SSB measurement configuration from network just before starting the SSB based measurement, i.e. just after CSI-RS based measurement result of PCell becomes lower than the first threshold. Or, it may be assumed that the UE has already SSB based measurement configuration. If the UE already has valid SSB based measurement configuration, the UE may not re-acquire the SSB based measurement configuration.

If the result of CSI-RS based measurement of PCell becomes higher than a second threshold while the UE performs the SSB based measurement in accordance with broadcast configuration, the UE may stop the SSB based measurement configured by broadcast configuration. The UE may keep performing the SSB based measurement in accordance with dedicated configuration.

Alternatively, if UE declares RLF while the UE doesn't perform SSB based measurement for the PCell, or if RRC connection re-establishment procedure is initiated while the UE doesn't perform SSB based measurement for the PCell, the UE may start performing SSB based measurement in accordance with the broadcast configuration. Desirably, even though the UE is performing the SSB based measurement for the PCell frequency, UE may start the SSB based measurement according to the broadcast configuration for frequency for which the UE doesn't perform SSB based measurement if CSI-RS based measurement result of PCell becomes lower than the first threshold.

If RRC connection re-establishment procedure is initiated, the UE may perform cell selection procedure based on the measurement result of the SSB based measurement. I.e. UE performs suitability check, i.e. decide whether the target cell satisfies cell selection criterion S or not, by using the measurement result of the SSB based measurement.

Figure 8:
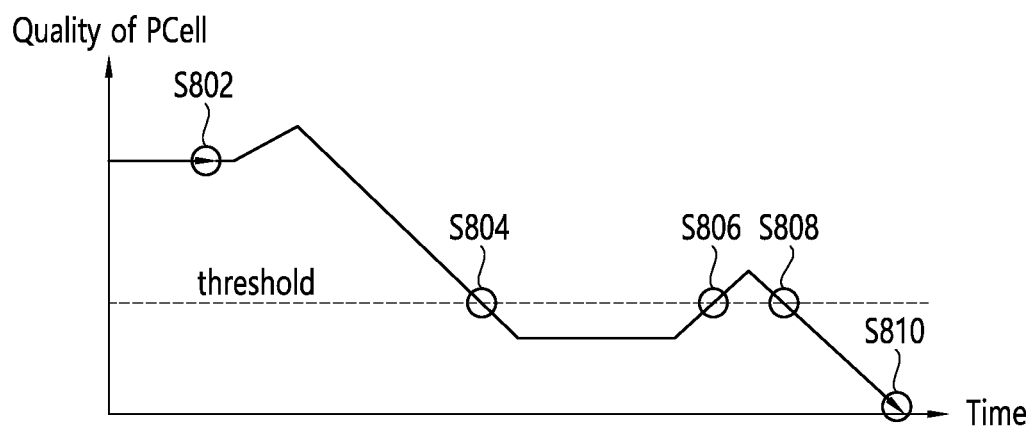
FIG. 8 shows an example of performing measurement according to an embodiment of the present invention.

FIG. 8 shows an example of performing measurement according to an embodiment of the present invention.

Referring to FIG. 8, the UE may perform CSI-RS based measurement of PCell. For that, the UE may receive the CSI-RS based measurement configuration for PCell frequency via dedicated configuration. The CSI-RS based measurement configuration may be include configurations for the first neighbor frequency. Further, the UE may receive SSB based measurement configuration for second neighbor frequency. However, it may be assumed that the UE does not have SSB based measurement configuration for the PCell.

In S802, the UE may perform the CSI-RS based measurement on PCell and the first neighbor frequency, and perform SSB based measurement on the second frequency in accordance with the dedicated configuration. The UE may measure quality of the PCell based on CSI-RS.

In step S804, when the result of the CSI-RS based measurement of PCell becomes lower than a threshold, the UE may receive system information to acquire SSB based measurement configuration. The SSB based measurement configuration may be configurations of SSB based measurement for the PCell. Also, the SSB based measurement configuration may be configurations of SSB based measurement for other neighbor cells (for example, the first neighbor cell). The SSB based measurement configuration for PCell frequency and the first neighbor frequency may be received via SIB3 and SIB4, respectively. The UE may start to perform SSB based measurement for PCell frequency and the first neighbour frequency.

In step S806, when the CSI-RS based PCell quality becomes higher than the threshold, the UE may stop the SSB based measurement for the PCell frequency and the first neighbour frequency. The UE may not stop the SSB based measurement for the second neighbor frequency because the UE receives dedicated configuration for the second frequency.

In step S808, when the CSI-RS based PCell quality becomes lower than the threshold again, the UE may start the SSB based measurement configuration in accordance with broadcast configuration.

In step S810, the UE may declare radio link failure and initiate RRC connection re-establishment procedure. When the RRC connection re-establishment is initiated, the UE may already acquire the result of SSB based measurement. Upon initiation of the procedure, the UE may perform cell selection based on the result of the SSB based measurement.

According to embodiments of the present invention, the UE may perform SSB based measurement without delays, by requesting configurations of the SSB based measurement as soon as the radio link problem is detected.

Figure 9:
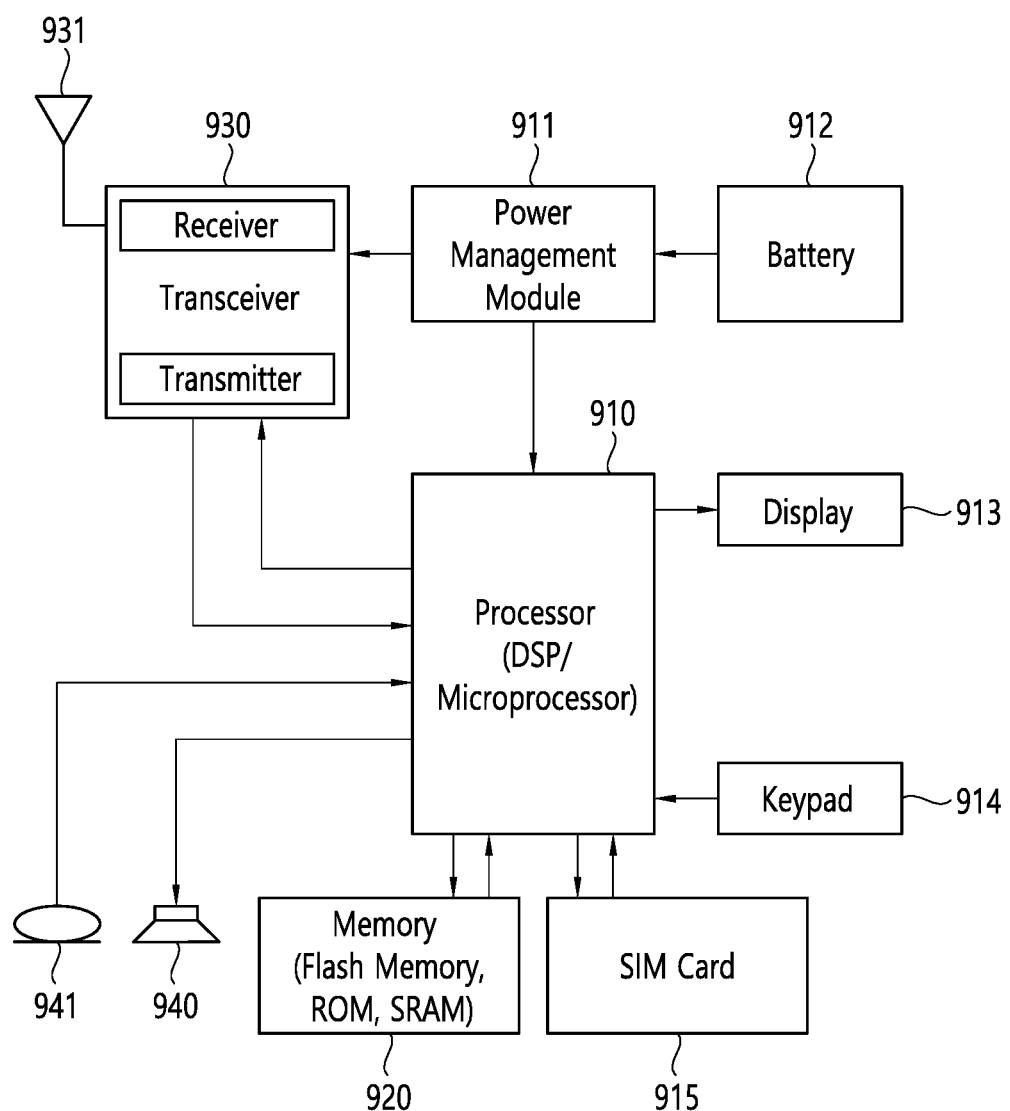
FIG. 9 shows more detailed UE to implement an embodiment of the present invention.

FIG. 9 shows more detailed UE to implement an embodiment of the present invention. The present invention described above for UE side may be applied to this embodiment.

A UE includes a processor 910, a power management module 911, a battery 912, a display 913, a keypad 914, a subscriber identification module (SIM) card 915, a memory 920, a transceiver 930, one or more antennas 931, a speaker 940, and a microphone 941.

The processor 910 may be configured to implement proposed functions, procedures and/or methods described in this description. Layers of the radio interface protocol may be implemented in the processor 910. The processor 910 may include ASIC, other chipset, logic circuit and/or data processing device. The processor 910 may be an application processor (AP). The processor 910 may include at least one of a digital signal processor (DSP), a central processing unit (CPU), a graphics processing unit (GPU), a modem (modulator and demodulator). An example of the processor 910 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

According to an embodiment of the present invention, the processor 910 may be configured to receive a first configuration of a first reference signal (RS) type based measurement. A result of the first RS type based measurement may be not used for cell selection. The first RS type based measurement may be a channel state information reference signal (CSI-RS) based measurement. The UE may be in RRC connected state. The processor 910 may be configured to may communicate with at least one of a mobile terminal, a network or autonomous vehicles other than the UE.

The processor 910 may be configured to perform the first RS based measurement on a serving cell based on the first configuration.

The processor 910 may be configured to initiate a second RS type based measurement on the serving cell, when a radio link problem related to the serving cell is detected. The serving cell may be a primary cell (PCell). The initiating the second RS type based measurement may include receiving a second configuration of the second RS type based measurement. The UE may receive the second configuration by requesting the second configuration before a radio link failure on the serving cell is detected. It may be determined that the radio link problem is detected based on a result of the first RS based measurement on the serving cell. It may be determined that the radio link problem is detected when a result of the first RS based measurement on the serving cell becomes below a first threshold. It may be determined that the radio link problem is detected when N consecutive out-of-sync indications for the serving cell is received from a physical layer. A result of the second RS type based measurement may be used for cell selection. The second RS type based measurement may be a SS/PBCH block (SSB) based measurement. The radio link problem may be at least one of radio link failure, handover failure, integrity check failure and radio resource control (RRC) connection reconfiguration failure.

The processor 910 may be configured to perform cell selection based on a result of the second RS type based measurement, when a radio link failure on the serving cell is detected. The UE may stop the second RS type based measurement, when the radio link problem related to the serving cell is resolved.

According to embodiments of the present invention, the UE may perform SSB based measurement without delays, by requesting configurations of the SSB based measurement as soon as the radio link problem is detected.

The processor 910 may be configured to communicate with at least one of a mobile terminal, a network or autonomous vehicles other than the UE.

The power management module 911 manages power for the processor 910 and/or the transceiver 930. The battery 912 supplies power to the power management module 911. The display 913 outputs results processed by the processor 910. The keypad 914 receives inputs to be used by the processor 910. The keypad 914 may be shown on the display 913. The SIM card 915 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 920 is operatively coupled with the processor 910 and stores a variety of information to operate the processor 910. The memory 920 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 920 and executed by the processor 910. The memory 920 can be implemented within the processor 910 or external to the processor 910 in which case those can be communicatively coupled to the processor 910 via various means as is known in the art.

The transceiver 930 is operatively coupled with the processor 910, and transmits and/or receives a radio signal. The transceiver 930 includes a transmitter and a receiver. The transceiver 930 may include baseband circuitry to process radio frequency signals. The transceiver 930 controls the one or more antennas 931 to transmit and/or receive a radio signal.

The speaker 940 outputs sound-related results processed by the processor 910. The microphone 941 receives sound-related inputs to be used by the processor 910.

The present invention may be applied to various future technologies, such as AI, robots, autonomous-driving/self-driving vehicles, and/or extended reality (XR).

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 10:
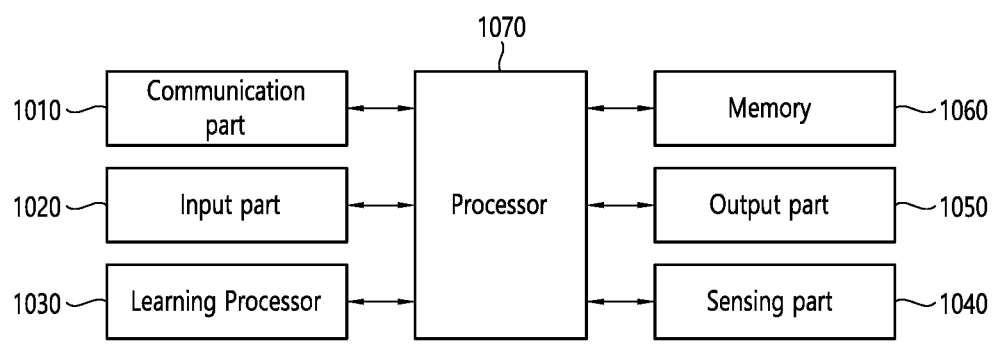
FIG. 10 shows an example of an AI device to which the technical features of the present invention can be applied.

FIG. 10 shows an example of an AI device to which the technical features of the present invention can be applied.

The AI device 1000 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 10, the AI device 1000 may include a communication part 1010, an input part 1020, a learning processor 1030, a sensing part 1040, an output part 1050, a memory 1060, and a processor 1070.

The communication part 1010 can transmit and/or receive data to and/or from external devices such as the AI devices and the AI server using wire and/or wireless communication technology. For example, the communication part 1010 can transmit and/or receive sensor information, a user input, a learning model, and a control signal with external devices. The communication technology used by the communication part 1010 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1020 can acquire various kinds of data. The input part 1020 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1020 can acquire input data to be used when acquiring an output using learning data and a learning model for model learning. The input part 1020 may obtain raw input data, in which case the processor 1070 or the learning processor 1030 may extract input features by preprocessing the input data.

The learning processor 1030 may learn a model composed of an ANN using learning data. The learned ANN can be referred to as a learning model. The learning model can be used to infer result values for new input data rather than learning data, and the inferred values can be used as a basis for determining which actions to perform. The learning processor 1030 may perform AI processing together with the learning processor of the AI server. The learning processor 1030 may include a memory integrated and/or implemented in the AI device 1000. Alternatively, the learning processor 1030 may be implemented using the memory 1060, an external memory directly coupled to the AI device 1000, and/or a memory maintained in an external device.

The sensing part 1040 may acquire at least one of internal information of the AI device 1000, environment information of the AI device 1000, and/or the user information using various sensors. The sensors included in the sensing part 1040 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1050 may generate an output related to visual, auditory, tactile, etc. The output part 1050 may include a display unit for outputting visual information, a speaker for outputting auditory information, and/or a haptic module for outputting tactile information.

The memory 1060 may store data that supports various functions of the AI device 1000. For example, the memory 1060 may store input data acquired by the input part 1020, learning data, a learning model, a learning history, etc.

The processor 1070 may determine at least one executable operation of the AI device 1000 based on information determined and/or generated using a data analysis algorithm and/or a machine learning algorithm. The processor 1070 may then control the components of the AI device 1000 to perform the determined operation. The processor 1070 may request, retrieve, receive, and/or utilize data in the learning processor 1030 and/or the memory 1060, and may control the components of the AI device 1000 to execute the predicted operation and/or the operation determined to be desirable among the at least one executable operation. The processor 1070 may generate a control signal for controlling the external device, and may transmit the generated control signal to the external device, when the external device needs to be linked to perform the determined operation. The processor 1070 may obtain the intention information for the user input and determine the user's requirements based on the obtained intention information. The processor 1070 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1030 and/or learned by the learning processor of the AI server, and/or learned by their distributed processing. The processor 1070 may collect history information including the operation contents of the AI device 1000 and/or the user's feedback on the operation, etc. The processor 1070 may store the collected history information in the memory 1060 and/or the learning processor 1030, and/or transmit to an external device such as the AI server. The collected history information can be used to update the learning model. The processor 1070 may control at least some of the components of AI device 1000 to drive an application program stored in memory 1060. Furthermore, the processor 1070 may operate two or more of the components included in the AI device 1000 in combination with each other for driving the application program.

Figure 11:
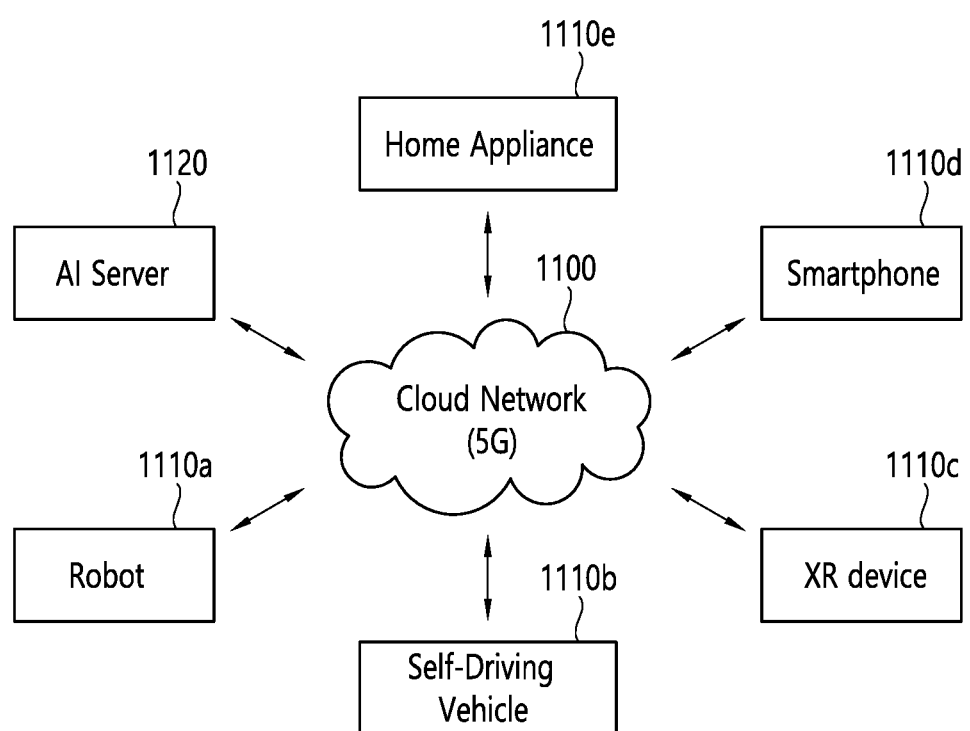
FIG. 11 shows an example of an AI system to which the technical features of the present invention can be applied.

FIG. 11 shows an example of an AI system to which the technical features of the present invention can be applied.

Referring to FIG. 11, in the AI system, at least one of an AI server 1120, a robot 1110*a*, an autonomous vehicle 1110*b*, an XR device 1110*c*, a smartphone 1110*d* and/or a home appliance 1110*e* is connected to a cloud network 1100. The robot 1110*a*, the autonomous vehicle 1110*b*, the XR device 1110*c*, the smartphone 1110*d*, and/or the home appliance 1110*e* to which the AI technology is applied may be referred to as AI devices 1110*a* to 1110*e*.

The cloud network 1100 may refer to a network that forms part of a cloud computing infrastructure and/or resides in a cloud computing infrastructure. The cloud network 1100 may be configured using a 3G network, a 4G or LTE network, and/or a 5G network. That is, each of the devices 1110*a* to 1110*e* and 1120 consisting the AI system may be connected to each other through the cloud network 1100. In particular, each of the devices 1110*a* to 1110*e* and 1120 may communicate with each other through a base station, but may directly communicate with each other without using a base station.

The AI server 1100 may include a server for performing AI processing and a server for performing operations on big data. The AI server 1100 is connected to at least one or more of AI devices constituting the AI system, i.e. the robot 1110*a*, the autonomous vehicle 1110*b*, the XR device 1110*c*, the smartphone 1110*d* and/or the home appliance 1110*e* through the cloud network 1100, and may assist at least some AI processing of the connected AI devices 1110*a* to 1110*e*. The AI server 1100 can learn the ANN according to the machine learning algorithm on behalf of the AI devices 1110*a* to 1110*e*, and can directly store the learning models and/or transmit them to the AI devices 1110*a* to 1110*e*. The AI server 1100 may receive the input data from the AI devices 1110*a* to 1110*e*, infer the result value with respect to the received input data using the learning model, generate a response and/or a control command based on the inferred result value, and transmit the generated data to the AI devices 1110*a* to 1110*e*. Alternatively, the AI devices 1110*a* to 1110*e* may directly infer a result value for the input data using a learning model, and generate a response and/or a control command based on the inferred result value.

Various embodiments of the AI devices 1110*a* to 1110*e* to which the technical features of the present invention can be applied will be described. The AI devices 1110*a* to 1110*e* shown in FIG. 11 can be seen as specific embodiments of the AI device 1000 shown in FIG. 10.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a user equipment (UE) operating in a wireless communication system, the method comprising:
    establishing a radio resource control (RRC) connection with a network;
    while in an RRC connected state:
    i) receiving, from the network via a dedicated signaling, a channel state information reference signal (CSI-RS) based measurement configuration;
    ii) performing a CSI-RS based measurement based on the CSI-RS based measurement configuration; and
    iii) starting to perform a synchronization signal block (SSB) based measurement based on an SSB based measurement configuration upon detecting a radio link problem related to a serving cell;
    declaring a radio link failure (RLF) based on the radio link problem related to the serving cell;
    initiating an RRC connection re-establishment procedure to recover the RRC connection with the network; and
    performing a cell selection based on results of the SSB based measurement.

2. The method of claim 1, wherein the method further comprises receiving, from the network via a broadcast signaling, system information to acquire the SSB based measurement configuration.

3. The method of claim 2, wherein the system information is received after detecting the radio link problem related to the serving cell.

4. The method of claim 1, wherein the radio link problem is detected based on a result of RS the CSI-RS based measurement becoming lower than a first threshold.

5. The method of claim 1, wherein the radio link problem is detected based on N consecutive out-of-sync indications for the serving cell being received from a physical layer.

6. The method of claim 1, wherein the serving cell is a primary cell (PCell).

7. The method of claim 1, wherein a result of the CSI-RS based measurement is not used for the cell selection.

8. The method of claim 1, further comprising:
stopping the SSB based measurement based on the radio link problem related to the serving cell being resolved.

9. The method of claim 1, wherein the UE communicates with at least one of a mobile terminal, a network or autonomous vehicles other than the UE.

10. A user equipment (UE) for operating in a wireless communication system, the UE comprising:
a transceiver;
a processor; and
a memory operably connectable to the processor and storing instructions that, based on being executed by the processor, perform operations comprising:
establishing a radio resource control (RRC) connection with a network;
while in an RRC connected state:
i) receiving, from the network via a dedicated signaling using the transceiver, a channel state information reference signal (CSI-RS) based measurement configuration;
ii) performing a CSI-RS based measurement based on the CSI-RS based measurement configuration; and
iii) starting to perform a synchronization signal block (SSB) based measurement based on an SSB based measurement configuration, upon detecting a radio link problem related to a serving cell;
declaring a radio link failure (RLF) based on the radio link problem related to the serving cell;
initiating an RRC connection re-establishment procedure to recover the RRC connection with the network; and
performing a cell selection based on results of the SSB based measurement.

11. A processing apparatus configured to operate a wireless communication device in a wireless communication system, the processing apparatus comprising:
a processor; and
a memory operably connectable to the processor, wherein the processor is configured to perform operations comprising:
establishing a radio resource control (RRC) connection with a network;
while in an RRC connected state:
i) obtaining a channel state information reference signal (CSI-RS) based measurement configuration;
ii) performing a CSI-RS based measurement based on the CSI-RS based measurement configuration; and
iii) starting to perform a synchronization signal block (SSB) based measurement based on an SSB based measurement configuration upon detecting a radio link problem related to a serving cell;
declaring a radio link failure (RLF) based on the radio link problem related to the serving cell;
initiating an RRC connection re-establishment procedure to recover the RRC connection with the network; and
performing a cell selection based on results of the SSB based measurement.

* * * * *